(12) United States Patent
Ito et al.

(10) Patent No.: US 10,259,177 B2
(45) Date of Patent: Apr. 16, 2019

(54) FILM MANUFACTURING METHOD AND MANUFACTURING APPARATUS

(71) Applicant: UBE INDUSTRIES, LTD., Ube-shi, Yamaguchi (JP)

(72) Inventors: Kazumi Ito, Ube (JP); Masakatsu Kimura, Ube (JP); Yuji Ogawa, Ube (JP); Taiki Hirohata, Ube (JP)

(73) Assignee: UBE INDUSTRIES, LTD., Yamaguchi (JP)

( * ) Notice: Subject to any disclaimer, the term of this patent is extended or adjusted under 35 U.S.C. 154(b) by 596 days.

(21) Appl. No.: 14/780,738

(22) PCT Filed: Mar. 6, 2014

(86) PCT No.: PCT/JP2014/055750
§ 371 (c)(1),
(2) Date: Sep. 28, 2015

(87) PCT Pub. No.: WO2014/156536
PCT Pub. Date: Oct. 2, 2014

(65) Prior Publication Data
US 2016/0039155 A1   Feb. 11, 2016

(30) Foreign Application Priority Data

Mar. 29, 2013 (JP) ................................ 2013-071134
Jun. 27, 2013 (JP) ................................ 2013-135301

(51) Int. Cl.
*B29L 7/00*      (2006.01)
*B29C 31/08*     (2006.01)
(Continued)

(52) U.S. Cl.
CPC .............. *B29C 71/02* (2013.01); *B29C 31/08* (2013.01); *B29C 35/045* (2013.01);
(Continued)

(58) Field of Classification Search
CPC . B29C 2071/022; B29C 31/08; B29C 35/045; B29C 65/787; B29C 65/7873; B29C 71/02; F26B 17/26
See application file for complete search history.

(56) References Cited

U.S. PATENT DOCUMENTS

| | | |
|---|---|---|
| 4,915,894 A | 4/1990 | Mitsui et al. |
| 5,125,994 A | 6/1992 | Harasta et al. |
| 2010/0032866 A1 | 2/2010 | Nakai et al. |

FOREIGN PATENT DOCUMENTS

| | | |
|---|---|---|
| JP | 01198638 A | 8/1989 |
| JP | 04286624 A | 10/1992 |

(Continued)

OTHER PUBLICATIONS

International Search Report (ISR) dated Jun. 10, 2014 issued in International Application No. PCT/JP2014/055750.

*Primary Examiner* — Stella K Yi
(74) *Attorney, Agent, or Firm* — Holtz, Holtz & Volek PC

(57) ABSTRACT

A film manufacturing method and manufacturing apparatus for manufacturing a film having excellent dimensional stability to heat at a good product yield and performing a stress relaxation treatment of the film include performing the stress relaxation treatment while conveying the film in a non-contact state using a levitation conveyance device for jetting a heated gas from gas injection holes to the film and conveying the film in a non-contact state. The film manufacturing method and manufacturing apparatus are particularly suitable for stress relaxation treatment of a polyimide film obtained by heat-treating a polyimide film precursor.

16 Claims, 8 Drawing Sheets

(51) Int. Cl.
*B29C 35/04* (2006.01)
*B29C 71/02* (2006.01)
*B29K 79/00* (2006.01)

(52) U.S. Cl.
CPC .... *B29C 2071/022* (2013.01); *B29K 2079/08* (2013.01); *B29L 2007/008* (2013.01)

(56) References Cited

FOREIGN PATENT DOCUMENTS

| | | | |
|---|---|---|---|
| JP | 04292934 | A | 10/1992 |
| JP | 05501387 | A | 3/1993 |
| JP | 0587377 | B2 | 12/1993 |
| JP | 2000072900 | A | 3/2000 |
| JP | 2000072901 | A | 3/2000 |
| JP | 2004299216 | A | 10/2004 |
| JP | 2006341394 | A | 12/2006 |
| JP | 2007045612 | * | 2/2007 |
| JP | 2012240370 | A | 12/2012 |
| WO | 9106420 | A1 | 5/1991 |

* cited by examiner (a)

(b)

(a)

(b)

(c)

(a)

(b)

FILM MANUFACTURING METHOD AND MANUFACTURING APPARATUS

TECHNICAL FIELD

The present invention relates to a film manufacturing method and manufacturing apparatus for performing a stress relaxation treatment of a film.

BACKGROUND ART

Polyimide films have high heat resistance and high electrical insulating properties, and meet handling requirements with regard to rigidity, heat resistance, or electrical insulating properties. Polyimide films are therefore widely used in industrial fields such as electrical insulating films, heat insulating films, base films for flexible circuit substrates, and solar cell substrates.

A polyimide film is manufactured by casting a polyimide precursor solution including polyamic acid or the like onto a support and drying the product to form a self-supporting film, and heat-treating the self-supporting film.

The heat-treated polyimide film has residual stress, and a stress relaxation treatment (annealing treatment) is therefore performed to relax the residual stress and enhance dimensional stability to heat.

For example, Patent Document 1 discloses manufacturing a polyimide film having improved heat-shrinking properties by heating a polyimide film in an essentially tensionless state at 150° C. to 420° C. for 1 second to 60 minutes, then cooling the polyimide film to room temperature.

Patent Document 2 discloses manufacturing a low-shrinkage polyimide film by continuously heat-treating a polyimide film in a hot airstream while applying a tension of 1 to 10 kg/m thereto in the length direction of the film, and then performing a cooling treatment.

Patent Document 3 discloses manufacturing a low-shrinkage polyimide film by irradiating a polyimide film with far infrared rays and heat-treating the polyimide film in a short time while maintaining a tension of 1 kg/m to 10 kg/m thereon in the length direction of the polyimide film, then performing a cooling treatment.

The applicability of stress relaxation treatments is not limited to polyimide films; various types of films are subjected to stress relaxation treatments in order to relax residual stress and enhance dimensional stability to heat.

PRIOR ART DOCUMENTS

Patent Documents

[Patent Document 1] Japanese Examined Patent Application No. 5-87377
[Patent Document 2] Japanese Laid-Open Patent Application No. 2000-72900
[Patent Document 3] Japanese Laid-Open Patent Application No. 2000-72901

DISCLOSURE OF THE INVENTION

Problems to Be Solved by the Invention

During stress relaxation treatment, the polyimide film is sometimes exposed to temperatures higher than the glass transition temperature (referred to hereinafter as Tg) of the polyimide film and placed in a softened state. Scratches and the like are therefore readily formed while the polyimide film is being conveyed through a stress relaxation device. Scratches and the like on the polyimide film lead to product defects, and therefore reduce product yield.

An object of the present invention is therefore to provide a film manufacturing method and manufacturing apparatus whereby a film having excellent dimensional stability to heat can be manufactured at a good product yield.

Means to Solve the Problems

The film manufacturing method of the present invention for achieving the abovementioned object is a film manufacturing method for performing a stress relaxation treatment of a film, and is characterized in that the stress relaxation treatment is performed using a levitation conveyance device provided with a plurality of film conveyance guides having convex curved film conveyance faces provided with gas injection holes, a heated gas being jetted to the film from the gas injection holes and the film being curved in alternatingly opposite directions and conveyed in a non-contact state.

According to the invention described above, the film is conveyed in a non-contact state using a levitation conveyance device provided with a plurality of film conveyance guides having convex curved film conveyance faces provided with gas injection holes, and the film can thereby be conveyed without receiving scratches or the like even when the film is heated by the heated gas and softened.

The rigidity of the film decreases and wrinkling is prone to occur when the film softens, but in the invention described above, the film is curved in alternatingly opposite directions, and the film is heated while being conveyed in a non-contact state. Rigidity due to shape is thereby increased by the curving of the film, and the occurrence of wrinkling can therefore be suppressed.

Preferably, in the film manufacturing method of the present invention, film presser devices are provided having concave curved faces arranged to face the film conveyance faces of the film conveyance guides across a predetermined gap from said film conveyance faces, gas injection holes being provided in said concave curved faces, and the heated gas is blown against both sides of the film and the film is conveyed in levitated fashion by the heated gas jetted from the gas injection holes of the film conveyance guides and the heated gas jetted from the gas injection holes of the film presser devices.

According to the invention of the aforedescribed aspect, the heated gas is blown against both sides of the film and the film is conveyed in levitated fashion by the heated gas jetted from the gas injection holes of the film conveyance guides and the heated gas jetted from the gas injection holes of the film presser devices. The flatness of the film can thereby be better maintained, and the film can be rapidly and uniformly heated.

Preferably, in the film manufacturing method of the present invention, the temperature of the heated gas jetted from the gas injection holes of the plurality of film conveyance guides is varied in the stress relaxation treatment.

According to the invention of the aforedescribed aspect, the temperature of the heated gas jetted from the gas injection holes of the plurality of film conveyance guides is varied, and the stress relaxation treatment can thereby be performed according to a desired temperature profile.

The film manufacturing method of the present invention is suitable particularly for stress relaxation treatment of a polyimide film obtained by heat-treating a polyimide film precursor.

Preferably, the stress relaxation treatment for the polyimide film has: a first step for heating the polyimide film to a temperature equal to or higher than a temperature which is set in a range of (polyimide film glass transition temperature (Tg)−150)° C. to (polyimide film glass transition temperature (Tg)+200)° C.; a second step for bringing the temperature of the polyimide film to a temperature which is set in a range of (polyimide film glass transition temperature (Tg)−150)° C. to (polyimide film glass transition temperature (Tg))° C. and is lower than the temperature set in the first step, after the first step is performed; and a third step for cooling the polyimide film to normal temperature after the second step is performed; the levitation conveyance device being used in at least the first step and the second step.

In the aspect described above, the polyimide film is placed in a softened state in the first and second steps and exposed to a state in which the flatness thereof may be adversely affected and scratching and the like readily occur, but by performing the stress relaxation treatment using the levitation conveyance device in at least the first and second steps, it is possible to more reliably prevent deterioration of flatness and the occurrence of scratching.

More preferably, in the aspect described above, the temperature of the polyimide film is decreased in stages in the second step and the third step.

The polyimide film heated to a temperature equal to or above the temperature described in the first step can thereby be smoothly cooled in the second and third steps, and it is possible to suppress the occurrence of wrinkling or roughness which accompanies sudden temperature changes, and the polyimide film can be given with better flatness.

Preferably, in the film manufacturing method of the present invention, the length of a linear part leading from one curved part to the next curved part in a conveyance path of the film is configured so as to be 50 mm or less.

According to the invention of the aforedescribed aspect, the length of the linear part in which rigidity is prone to decrease is configured so as to be 50 mm or less, and the occurrence of wrinkling due to decreased rigidity of the film can thereby be suppressed.

Preferably, in the film manufacturing method of the present invention, the curvature radius of the curved parts in the conveyance path of the film is configured so as to be more than 15 mm and no more than 270 mm.

According to the invention of the aforedescribed aspect, the curvature radius of the curved parts in the conveyance path of the film is configured so as to be more than 15 mm and no more than 270 mm. Since rigidity of the film due to shape is thereby increased by the curving of the film at the abovementioned curvature radius, even when the film is heated by the heated gas and softened, the occurrence of wrinkling can therefore be more effectively suppressed.

Preferably, in the film manufacturing method of the present invention, the angle at which the conveyance path of the film curves along the film conveyance face of one film conveyance guide is configured so as to be 90 to 270°.

According to the invention of the aforedescribed aspect, the angle of curving along the film conveyance face of one film conveyance guide is configured so as to be 90 to 270°. Rigidity in the curved part can thereby be further increased, and the occurrence of wrinkling can be more effectively suppressed.

Preferably, in the film manufacturing method of the present invention, the film conveyance faces of the film conveyance guides are formed from a porous material and configured having a structure in which the heated gas is jetted through said porous material.

According to the invention of the aforedescribed aspect, it is possible for the heated gas to be blown substantially uniformly against the film to perform the stress relaxation treatment on the film. Furthermore, the occurrence of wrinkling, roughness, or the like on the film surface can be suppressed, and a film having good flatness can be thereby efficiently manufactured.

Preferably, in the film manufacturing method of the present invention, the stress relaxation treatment is performed by joint use of heating by heated gas jetted from the levitation conveyance device and heating due to an infrared heater.

The film manufacturing apparatus of the present invention is a film manufacturing apparatus having a stress relaxation device for performing a stress relaxation treatment of a film, and is characterized in that the stress relaxation device is provided with a levitation conveyance device for jetting a heated gas from gas injection holes to the film and heating and conveying the film in a non-contact state, and the levitation conveyance device is provided with a plurality of film conveyance guides having convex curved film conveyance faces provided with gas injection holes, convex curved faces of the film conveyance guides being arranged so as to alternatingly face in opposite directions, and the levitation conveyance device being configured so as to jet the heated gas from the gas injection holes to the film and convey the film in a non-contact state in which the film is curved in alternatingly opposite directions.

According to the invention described above, the film is conveyed in a non-contact state using a levitation conveyance device provided with a plurality of film conveyance guides having convex curved film conveyance faces provided with gas injection holes, and the film can thereby be conveyed without receiving scratches or the like even when the film is heated by the heated gas and softened.

The rigidity of the film decreases and wrinkling is prone to occur when the film softens, but in the invention described above, the film is curved in alternatingly opposite directions, and the film is heated while being conveyed in a non-contact state. Rigidity due to shape is thereby increased by the curving of the film, and the occurrence of wrinkling can therefore be suppressed.

Preferably, in the film manufacturing apparatus of the present invention, the levitation conveyance device is further provided with film presser devices having concave curved faces arranged to face the film conveyance faces of the film conveyance guides across a predetermined gap from said film conveyance faces, gas injection holes being provided in said concave curved faces, and the heated gas is blown against both sides of the film and the film is conveyed in levitated fashion by the heated gas jetted from the gas injection holes of the film conveyance guides and the heated gas jetted from the gas injection holes of the film presser devices.

According to the invention of the aforedescribed aspect, a heated gas is blown against both sides of the film and the film is conveyed in levitated fashion by the heated gas jetted from the gas injection holes of the film conveyance guides and the heated gas jetted from the gas injection holes of the film presser devices. The flatness of the film can thereby be better maintained, and the film can be rapidly and uniformly heated.

Preferably, in the film manufacturing apparatus of the present invention, the plurality of film conveyance guides are configured so that the temperature of the gas jetted from the gas injection holes can be individually set.

According to the invention of the aforedescribed aspect, the temperature of the heated gas jetted from the gas injection holes of the plurality of film conveyance guides is varied, and the stress relaxation treatment can thereby be performed according to a desired temperature profile.

The film manufacturing apparatus of the present invention is suitable particularly for stress relaxation treatment of a polyimide film obtained by heat-treating a polyimide film precursor.

Preferably, in the film manufacturing apparatus of the present invention, the length of a linear part leading from one curved part to the next curved part in a conveyance path of the film formed by the film conveyance guides is set so as to be 50 mm or less.

According to the invention of the aforedescribed aspect, the length of the linear part in which rigidity is prone to decrease is configured so as to be 50 mm or less, and the occurrence of wrinkling due to decreased rigidity of the film can thereby be suppressed.

Preferably, in the film manufacturing apparatus of the present invention, the curvature radius of the film conveyance faces of the film conveyance guides is configured so as to be 15 mm to 250 mm.

According to the invention of the aforedescribed aspect, the curvature radius of the film conveyance faces of the film conveyance guides is configured so as to be 15 mm to 250 mm, whereby the curvature radius of curved parts in the conveyance path of the film is also set to a corresponding length (a curvature radius larger by an amount commensurate with the amount of levitation over the film conveyance faces). Since rigidity of the film due to shape is therefore further increased by the curving of the film at the abovementioned curvature radius, even when the film is heated by the heated gas and softened, the occurrence of wrinkling can therefore be more effectively suppressed.

Preferably, in the film manufacturing apparatus of the present invention, the angle at which the film conveyance path formed by the film conveyance guides curves along the film conveyance face of one film conveyance guide is set so as to be 90 to 270°.

According to the invention of the aforedescribed aspect, the angle of curving along the film conveyance face of one film conveyance guide is configured so as to be 90 to 270°. Rigidity in the curved part can thereby be further increased, and the occurrence of wrinkling can be more effectively suppressed.

Preferably, in the film manufacturing apparatus of the present invention, the film conveyance faces of the film conveyance guides are formed from a porous material and configured having a structure in which the heated gas is jetted through said porous material.

According to the invention of the aforedescribed aspect, it is possible for the heated gas to be blown substantially uniformly against the film to perform the stress relaxation treatment on the film. Furthermore, the occurrence of wrinkling, roughness, or the like on the film surface can be suppressed, and a film having good flatness can be thereby efficiently manufactured.

Preferably, in the film manufacturing apparatus of the present invention, an infrared heater for heating the film conveyed in a non-contact state over the levitation conveyance device is arranged in the region in which the levitation conveyance device is arranged.

Advantageous Effects of the Invention

According to the present invention, the film is conveyed in a non-contact state using a levitation conveyance device provided with a plurality of film conveyance guides having convex curved film conveyance faces provided with gas injection holes, and the film can thereby be conveyed without receiving scratches or the like even when the film is heated by the heated gas and softened. Also, the film is curved in alternatingly opposite directions and conveyed, and the rigidity thereof due to shape is thereby increased, and wrinkling can therefore be suppressed even when the film is softened.

BRIEF DESCRIPTION OF THE DRAWINGS

FIG. 3(a) is a perspective view.

FIG. 6(a) is a perspective view.

FIG. 7(a) is a perspective view.

BEST MODE FOR CARRYING OUT THE INVENTION

Figure 1:
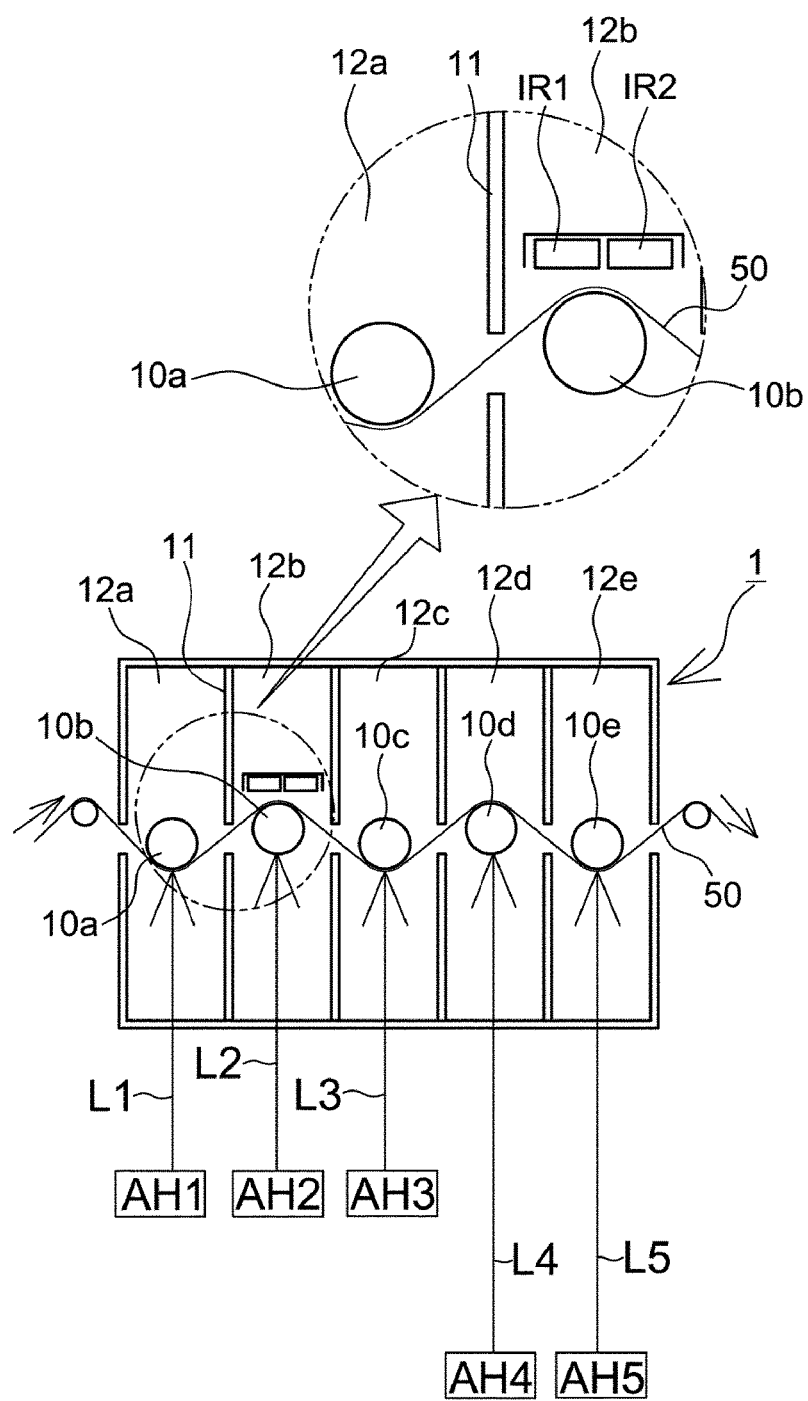
FIG. 1 is a schematic diagram of the stress relaxation device used in the polyimide film manufacturing apparatus according to a first embodiment of the present invention.

The film manufacturing method of the present invention is a method for performing a stress relaxation treatment of a film. In particular, the method is suitable for heat treating a polyimide film precursor and obtaining a polyimide film, and then performing a stress relaxation treatment for relaxing stress that remains in the polyimide film. The present invention is characterized in that the stress relaxation treatment is performed using a levitation conveyance device for jetting a heated gas to the film from gas injection holes and conveying the film in a non-contact state. The present invention is described in detail below using an example in which the present invention is applied to a polyimide film manufacturing method.

Step for Heat Treating a Polyimide Film Precursor to Obtain a Polyimide Film

The process leading up to the stress relaxation treatment will first be described.

A polyimide precursor solution including polyamic acid and an organic solvent is cast onto a support, and a flow-cast product is formed. The flow-cast product corresponds to the polyimide film precursor in the present invention.

The polyamic acid can be manufactured by reacting a tetracarboxylic acid dianhydride component and a diamine component by a publicly known method. For example, the polyamic acid can be manufactured by polymerizing a tetracarboxylic acid dianhydride component and a diamine component in an organic solvent commonly used in polyimide manufacturing.

Aromatic tetracarboxylic dianhydrides, aliphatic tetracarboxylic dianhydrides, alicyclic tetracarboxylic dianhydrides, and the like are cited as examples of the tetracarboxylic dianhydride component. Specific examples thereof include 3,3',4,4'-biphenyltetracarboxylic dianhydride, pyromellitic dianhydride, 3,3',4,4'-oxydiphthalic dianhydride, diphenylsulfone-3,4,3',4'-tetracarboxylic dianhydride, bis(3,4-dicarboxyphenyl)sulfide dianhydride, 2,2-bis(3,4-dicarboxyphenyl)-1,1,1,3,3,3-hexafluoropropane dianhydride, and the like.

Aromatic diamines, aliphatic diamines, alicyclic diamines, and the like are cited as examples of the diamine component. Specific examples thereof include p-phenylenediamine, 4,4'-diaminodiphenyl ether, 3,4'-diaminodiphenyl ether, m-tolidine, p-tolidine, 5-amino-2-(p-aminophenyl) benzoxazole, 4,4'-diaminobenzanilide, 1,3-bis(4-aminophenoxy)benzene, 1,4-bis(3-aminophenoxy)benzene, 1,4-bis(4-aminophenoxy)benzene, 3,3'-bis(3-aminophenoxy)biphenyl, 3,3'-bis(4-aminophenoxy)biphenyl, 4,4'-bis(3-aminophenoxy)biphenyl, 4,4'-bis(4-aminophenoxy)biphenyl, bis[3-(3-aminophenoxy)phenyl]ether, bis[3-(4-aminophenoxy)phenyl]ether, bis[4-(3-aminophenoxy)phenyl]ether, bis[4-(4-aminophenoxy)phenyl]ether, 2,2-bis[3-(3-aminophenoxy)phenyl]propane, 2,2-bis[3-(4-aminophenoxy)phenyl]propane, 2,2-bis[4-(3-aminophenoxy)phenyl]propane, 2,2-bis[4-(4-aminophenoxy)phenyl]propane, and the like.

Examples (1) through (6) are cited below as examples of combinations of the tetracarboxylic acid dianhydride component and the diamine component. These combinations are preferred from the perspective of mechanical characteristics and heat resistance.

(1) The combination of 3,3',4,4'-biphenyltetracarboxylic dianhydride and p-phenylenediamine.

(2) The combination of 3,3',4,4'-biphenyltetracarboxylic dianhydride, p-phenylenediamine, and 4,4-diaminodiphenyl ether.

(3) The combination of pyromellitic dianhydride and p-phenylenediamine.

(4) The combination of pyromellitic dianhydride, p-phenylenediamine, and 4,4-diaminodiphenyl ether.

(5) The combination of 3,3',4,4'-biphenyltetracarboxylic dianhydride, pyromellitic dianhydride, and p-phenylenediamine.

(6) The combination of 3,3',4,4'-biphenyltetracarboxylic dianhydride, pyromellitic dianhydride, p-phenylenediamine, and 4,4-diaminodiphenyl ether.

An organic solvent capable of dissolving polyamic acid is suitable as the organic solvent. A publicly known organic solvent may be used. Examples thereof include N-methyl-2-pyrrolidone, N,N-dimethylformamide, N,N-dimethylacetamide, N,N-diethylacetamide, and the like. These solvents may be used singly, or two or more thereof may be used jointly.

When imidization of the polyimide precursor solution is to be completed by a thermal imidization reaction, an imidization catalyst or the like may be added to the polyimide precursor solution as needed. When imidization of the polyimide precursor solution is to be completed by a chemical imidization reaction, a cyclization catalyst, a dehydrating agent, or the like may be added to the polyimide precursor solution as needed.

Substituted or unsubstituted nitrogen-containing heterocyclic compounds, N-oxide compounds of nitrogen-containing heterocyclic compounds, substituted or unsubstituted amino acid compounds, and aromatic hydrocarbon compounds or aromatic heterocyclic compounds having hydroxyl groups are cited as examples of the imidization catalyst.

Aliphatic tertiary amines, aromatic tertiary amines, heterocyclic tertiary amines, and the like are cited as examples of the cyclization catalyst. Specific examples of cyclization catalysts include trimethylamine, triethylamine, dimethylaniline, pyridine, β-picoline, isoquinoline, quinolone, and the like.

Aliphatic carboxylic anhydrides, aromatic carboxylic anhydrides, and the like are cited as examples of the dehydrating agent. Specific examples of dehydrating agents include acetic anhydride, propionic anhydride, butyric anhydride, formic anhydride, succinic anhydride, maleic anhydride, phthalic anhydride, benzoic anhydride, picolinic anhydride, and the like.

The solids concentration (polymer component) of the polyimide precursor solution is not particularly limited insofar as the solids concentration gives a viscosity range suitable for manufacturing a film by casting. The solids concentration is preferably 10 to 30% by mass, more preferably 15 to 27% by mass, and more preferably 16 to 24% by mass.

The flow-cast product is then introduced into a drying furnace and dried, and a self-supporting film (polyimide film precursor) having self-supporting properties is formed. Here, to have self-supporting properties means to have sufficient strength to allow peeling from a support.

The drying conditions (heating conditions) for forming the self-supporting film are not particularly limited. Heating is preferably performed at a temperature of 100 to 180° C. for 2 to 60 minutes, and more preferably at a temperature of 120 to 160° C. for 4 to 30 minutes. The temperature referred to in this context is the atmospheric temperature measured by a thermocouple installed in the furnace.

The self-supporting film is then peeled from the support, and a curing step is performed. The method for peeling the self-supporting film from the support is not particularly limited, and a method, in which the self-supporting film is cooled, tension is applied thereto by a roller, and the film is peeled, is cited as an example thereof.

In the curing step, the self-supporting film is introduced into a curing furnace and heat-treated, solvent removal and imidization are completed and the self-supporting film is heat-cured, and a polyimide film is obtained. The curing furnace corresponds to the "heating device for heat-treating the polyimide film precursor" in the polyimide film manufacturing apparatus of the present invention.

A publicly known method can be used as the method for heating the self-supporting film. An example of a suitable heating method is gradually heating for approximately 0.05 to 5 hours, preferably 0.1 to 3 hours, at a temperature of approximately 100 to 400° C. to imidize the self-supporting film and evaporate/remove the solvent therefrom. The self-supporting film may be heated in stages. For example, the self-supporting film may be heated at a relatively low temperature of approximately 100 to 170° C. for approximately 0.5 to 30 minutes to perform a first heat treatment, then heated at a temperature of 170° C. to 220° C. for approximately 0.5 to 30 minutes to perform a second heat treatment, and then heated at a temperature of 220° C. to 400° C. for approximately 0.5 to 30 minutes to perform a third heat treatment. As needed, a fourth heat treatment may be performed after the third heat treatment by heating at 400° C. to 550° C., preferably 450 to 520° C. The temperature herein is the surface temperature of the film as measured by a thermocouple affixed to the film.

In the curing step, the self-supporting film is preferably cured while being held by a holding fixture such as a pin tenter, a clip, or a frame. Film shrinkage accompanying the heating and curing can thereby be suppressed, and roughness or the like on the film surface can be prevented from occurring. Curing is more preferably performed while the film is fixed in the direction at a right angle to the longitudinal direction of a long self-supporting film, namely, both edges of the film in the width direction thereof are fixed by a holding fixture. The self-supporting film in the curing step may also be expanded in the width direction or the length direction thereof and heated, as needed.

Stress Relaxation (Annealing) Treatment

In the present invention, the polyimide film obtained by heat treating the polyimide film precursor in the manner described above is subjected to a stress relaxation treatment using a stress relaxation device provided with a levitation conveyance device for jetting a heated gas to the polyimide film from gas injection holes and conveying the polyimide film in a non-contact state. The stress relaxation treatment is preferably performed without fixing the film in the width direction thereof by a holding fixture.

First Embodiment

The stress relaxation device used in a first embodiment of the present invention will first be described with reference to FIG. 1.

The stress relaxation device 1 illustrated in FIG. 1 is provided with a plurality of substantially cylindrical film conveyance guides 10a, 10b, 10c, 10d, 10e. The polyimide film 50 is arranged in a tensioned state between the film conveyance guides 10a through 10e so as to zigzag therebetween. Five film conveyance guides are arranged in FIG. 1, but the number of film conveyance guides is not particularly limited. The distance and time of processing by the film conveyance guides can be adjusted by changing the outside diameter or number of film conveyance guides.

Gas injection holes are formed in at least a portion of the surface of each of the film conveyance guides 10a through 10e, and the faces of the film conveyance guides 10a through 10e constitute film conveyance faces. Gas introduction pipes L1 through L5 extending from hot-wind heaters AH1 through AH5 are connected to the film conveyance guides 10a through 10e. Each of the hot-wind heaters AH1 through AH5 is configured so that the temperature of the hot wind supplied thereby can be independently adjusted. When the heated gas is introduced through the gas introduction pipes to the film conveyance guides 10a through 10e, the heated gas is jetted from the gas injection holes provided in the film conveyance faces of the film conveyance guides 10a through 10e. The polyimide film can thereby be heated and subjected to stress relaxation treatment while being conveyed in a non-contact state.

In the present embodiment, the film conveyance guides 10a through 10e correspond to the levitation conveyance device in the present invention, which is configured so that gas having a temperature pre-set separately in advance from each film conveyance guide is jetted by the hot-wind heaters AH1 through 5.

The temperature of the heated gas jetted from the film conveyance guides can be adjusted, as appropriate, according to the type and thickness of the polyimide film, and so that the surface temperature of the polyimide film has a desired temperature profile along the conveyance path.

The flow speed of the heated gas jetted from the film conveyance guides is not particularly limited, and can be adjusted, as appropriate, according to such characteristics as the thickness of the polyimide film. The flow speed of the heated gas is preferably 0.1 to 3 m/sec, and more preferably 0.1 to 1 m/sec.

The airflow volume of the heated gas jetted from the film conveyance guides is not particularly limited, but is preferably adjusted so that the gap (levitation height) between the film conveyance guides and the polyimide film is 0.1 to 20 mm, and more preferably 0.1 to 5 mm.

A preferred form for a film conveyance guide will be described using FIG. 3. FIG. 3(a) is a perspective view of a film conveyance guide, and FIG. 3(b) is a sectional view along line A-A of FIG. 3(a).

Figure 3:
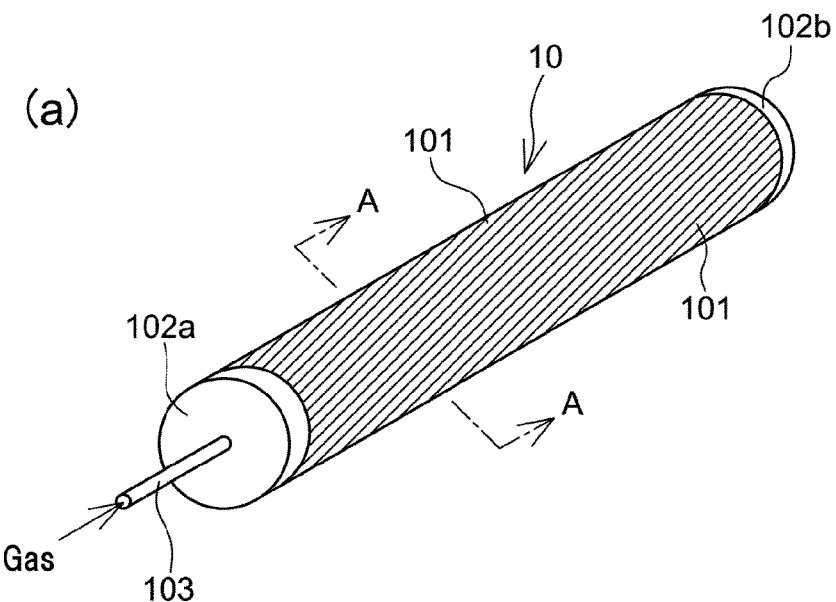
FIGS. 3(a) and (b) are schematic diagrams illustrating an embodiment of the film conveyance guide, where
FIG. 3(b) is a sectional view along line A-A in FIG. 3(a)
Figure 3:
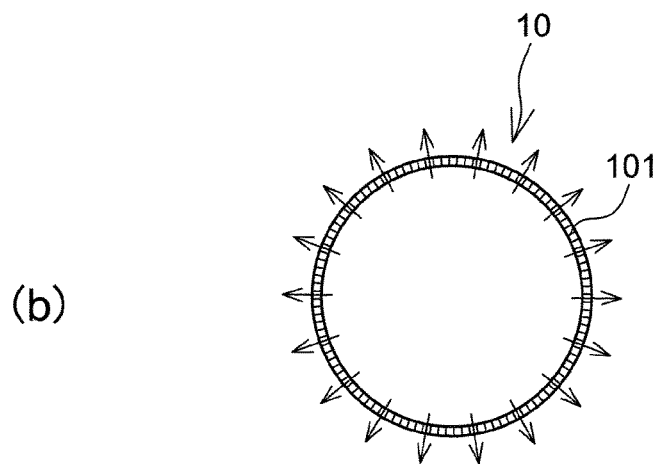

The film conveyance guide 10 illustrated in FIG. 3 is substantially cylindrical overall, and a porous material 101 is arranged along substantially the entire periphery thereof except at both end parts 102a, 102b thereof. A gas introduction pipe 103 is connected to one end part 102a.

In the film conveyance guide 10, gas is introduced to the film conveyance guide 10 and is thereby jetted to the outside through the porous material 101, as illustrated in FIG. 3(b). The polyimide film can therefore be conveyed in a non-contact state over the film conveyance guide 10 by the jetting pressure of the gas jetted from the porous material 101. The gas can also be substantially uniformly blown against the entire surface of the polyimide film passing over the film conveyance guide 10, and the polyimide film can therefore be evenly heated.

In the film conveyance guide 10 illustrated in FIG. 3, the region in which the porous material 101 is formed is preferably 1 to 1.5 times the width of the polyimide film conveyed over the film conveyance guide 10, and more preferably 1 to 1.1 times the width of the polyimide film. Configuring the region in which the porous material 101 is formed to be in this range makes it possible for the heated gas to be blown and the stress relaxation treatment to be performed substantially uniformly over the entire surface of the polyimide film.

In the film conveyance guide 10 illustrated in FIG. 3, the porous material 101 is not particularly limited; a porous material obtained by molding a layered mesh, a porous ceramic, a porous metal, a punched metal material, or the like in a substantially cylindrical shape or a shape in which a portion thereof has a curved face is cited as an example thereof. The use of a layered mesh or a porous ceramic is particularly preferred.

The opening diameter of the porous material 101 in terms of an equivalent circle is preferably greater than zero and 2 mm or less, and the hole spacing is preferably greater than zero and 3 mm or less. The opening diameter in terms of an equivalent circle is more preferably greater than zero and 0.3 mm or less, and the hole spacing is more preferably greater than zero and 0.5 mm or less. When the opening diameter or hole spacing of the porous material 101 is as described above, the heated gas can be blown and the stress relaxation treatment performed substantially uniformly over the entire surface of the polyimide film while the polyimide film is conveyed in a non-contact state. When the opening diameter of the porous material 101 exceeds 2 mm or the hole spacing exceeds 3 mm, uneven heating and other effects may occur during the stress relaxation treatment. In the present invention, the opening diameter in terms of an equivalent circle is the diameter of the circle obtained by converting the area of an opening to a circle of equivalent area.

Figure 4:
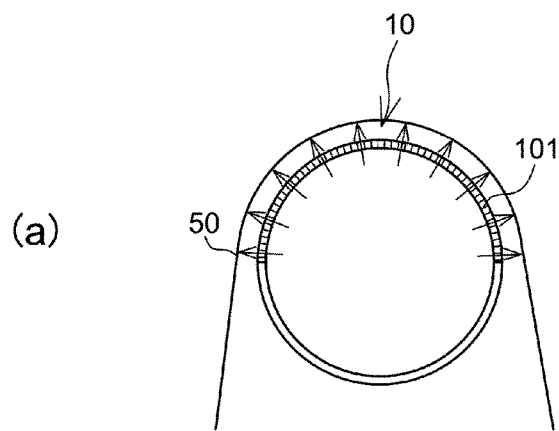
FIGS. 4(a), (b) and (c) are schematic diagrams illustrating a modification of the film conveyance guide of FIGS. 3(a) and (b)
Figure 4:
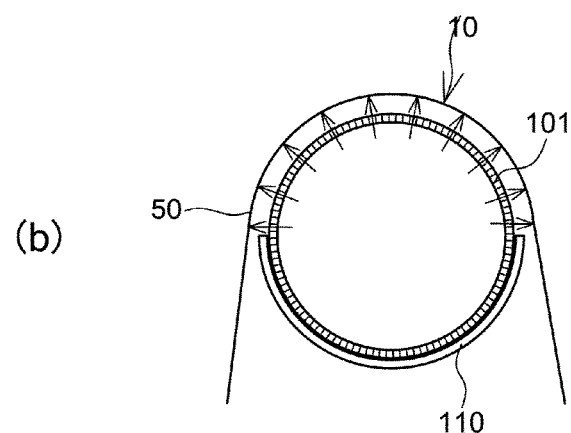
Figure 4:
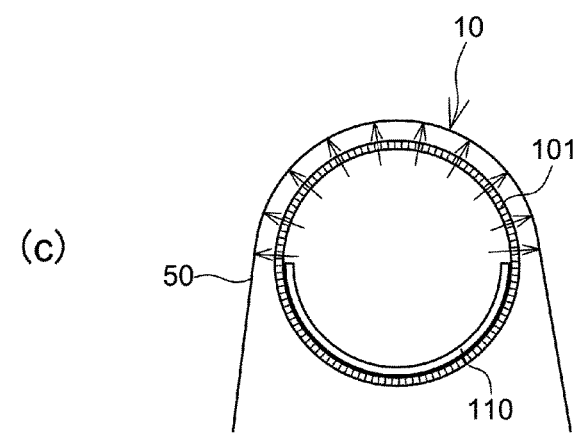

The film conveyance guide 10 illustrated in FIG. 3 is configured so that the porous material 101 is formed on the entire periphery thereof and the gas is jetted from the entire periphery of the film conveyance guide 10. However, the film conveyance guide may also be configured so that the porous material 101 is formed only on the film conveyance face (portion over which the polyimide film 50 passes) and the gas is jetted only from the film conveyance face, as illustrated in FIG. 4(a). A configuration may also be adopted in which the porous material 101 is formed on the entire periphery but a mask material 110 is arranged on a portion other than the film conveyance face, and the gas is jetted only from the film conveyance face, as illustrated in FIGS. 4(b) and 4(c). In FIG. 4(b), the mask material 110 is arranged on the external periphery of the film conveyance guide 10, and in FIG. 4(c), the mask material 110 is arranged on the internal periphery of the film conveyance guide 10.

Figure 5:
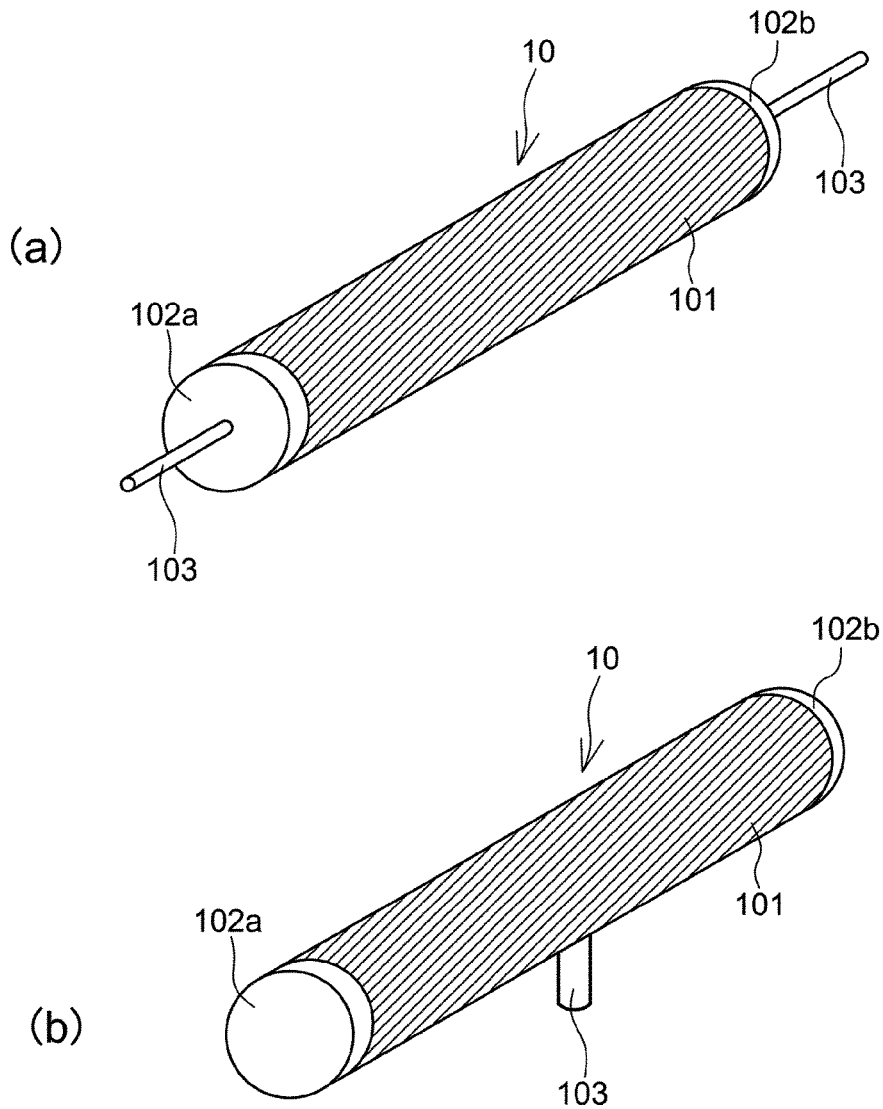
FIGS. 5(a) and (b) are schematic diagrams illustrating a modification of the film conveyance guide of FIGS. 3(a) and (b)

In the film conveyance guide 10 illustrated in FIG. 3, the gas introduction pipe 103 is provided to only one end part of the film conveyance guide 10, but a gas introduction pipe may be provided to both ends of the film conveyance guide 10, as illustrated in FIG. 5(a). A gas introduction pipe may also be provided near the center of the film conveyance guide 10 on the reverse side thereof from the film conveyance face, as illustrated in FIG. 5(b).

The film conveyance guide 10 illustrated in FIG. 3 is substantially cylindrical, but the shape of the film conveyance guide 10 is not particularly limited, and the film conveyance face need only have a convex curved shape. For example, the film conveyance guide may have a substantially half-cylindrical shape in which the film conveyance face is provided on the curved-surface side thereof.

Another example of the film conveyance guide will be described using FIG. 6. FIG. 6(a) is a perspective view illustrating the film conveyance guide, and FIG. 6(b) is a plan view illustrating a portion of the film conveyance guide in FIG. 6(a).

Figure 6:
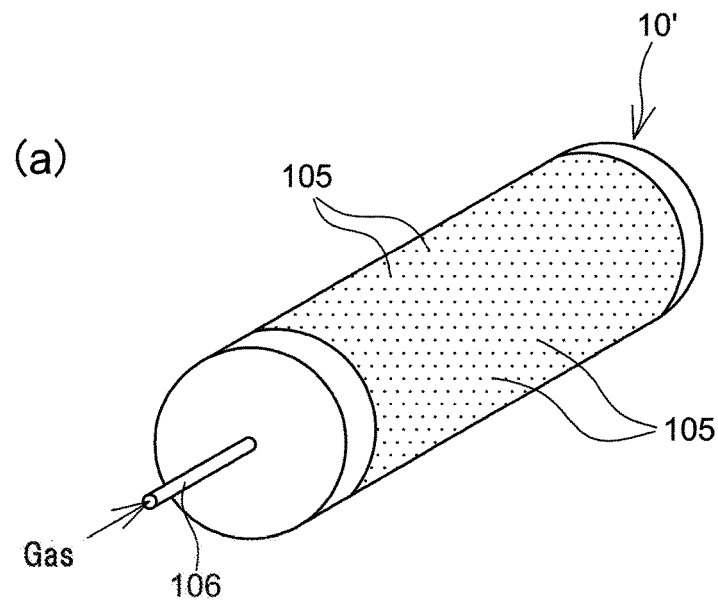
FIGS. 6(a) and (b) are schematic diagrams illustrating another embodiment of the film conveyance guide, where
FIG. 6(b) is a plan view.
Figure 6:
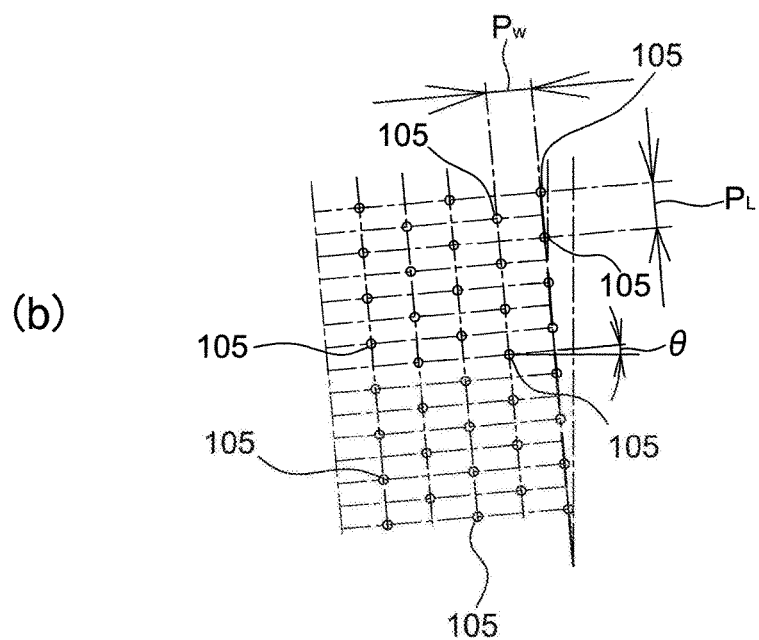

The film conveyance guide 10' illustrated in FIG. 6 is substantially cylindrical overall, and gas jetting holes 105 are punched in a film conveyance face provided on a curved surface. A gas introduction pipe 106 is connected to one end.

In the film conveyance guide 10' illustrated in FIG. 6, the region in which the gas jetting holes 105 are punched is preferably 1 to 1.5 times the width of the polyimide film conveyed over the film conveyance guide 10', and more preferably 1 to 1.1 times the width of the polyimide film. Configuring the region in which the gas jetting holes 105 are punched to be in this range makes it possible for the heated gas to be blown and the stress relaxation treatment to be performed substantially uniformly over the entire surface of the polyimide film.

The gas jetting holes 105 are aligned at a predetermined interval in the width direction and movement direction of the film, and the direction in which the gas injection holes are arranged is preferably inclined an angle θ with respect to the width direction or the movement direction. The angle θ is preferably 0 to 45°, and more preferably 3 to 10°.

In the film conveyance guide 10' illustrated in FIG. 6, the gas introduction pipe 106 is provided to only one end part of the film conveyance guide 10', but a gas introduction pipe may be provided to both ends of the film conveyance guide 10'. A gas introduction pipe may also be provided near the center of the film conveyance guide 10' on the reverse side thereof from the film conveyance face.

The film conveyance guide 10' illustrated in FIG. 6 is substantially cylindrical, but the film conveyance guide may also have a substantially half-cylindrical shape in which the film conveyance face is formed in a curved surface. The shape of the film conveyance guide is not particularly limited, but a shape in which the film conveyance face is convex and curved is preferred for use.

Another example of the film conveyance guide will be described using FIG. 7. FIG. 7(a) is a perspective view illustrating the film conveyance guide, and FIG. 7(b) is a plane view illustrating a portion of the film conveyance guide in FIG. 7(a).

Figure 7:
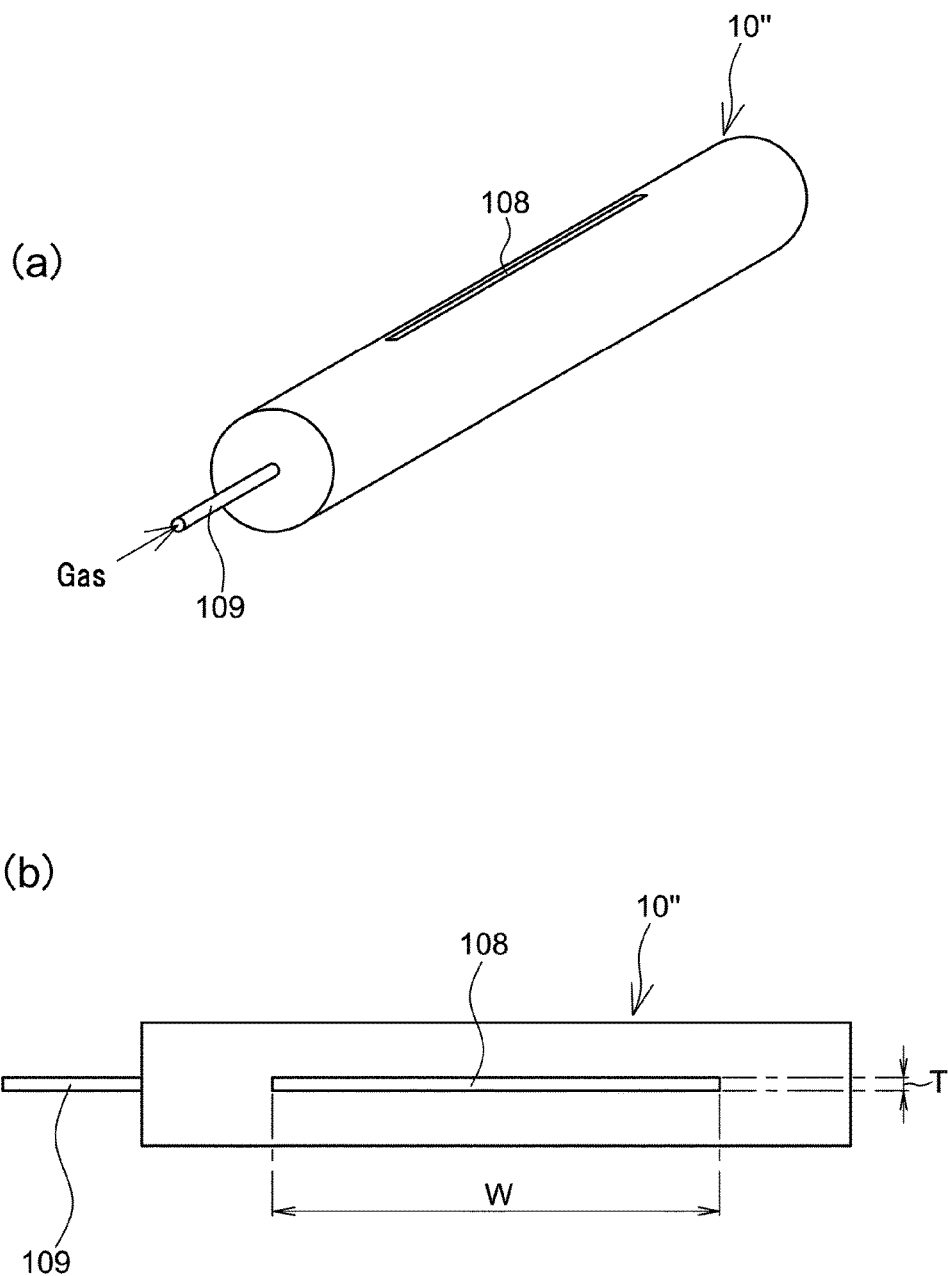
FIGS. 7(a) and (b) are schematic diagrams illustrating another embodiment of the film conveyance guide, where
FIG. 7(b) is a plan view.

The film conveyance guide 10" illustrated in FIG. 7 is substantially cylindrical overall, and a slit nozzle 108 is formed in a film conveyance face thereof. A gas introduction pipe 109 is connected to one end.

The thickness T of the slit nozzle 108 is preferably 2 mm or less, and more preferably 0.5 mm or less.

The width W of the slit nozzle 108 is preferably 1 to 1.5 times the width of the polyimide film conveyed over the film conveyance guide 10", and more preferably 1 to 1.1 times the width of the polyimide film. Configuring the width W of the slit nozzle 108 to be in this range makes it possible for the heated gas to be blown and the stress relaxation treatment to be performed substantially uniformly over the entire surface of the polyimide film.

In the film conveyance guide 10" illustrated in FIG. 6, the gas introduction pipe 109 is provided to only one end part of the film conveyance guide 10", but a gas introduction pipe may be provided to both ends of the film conveyance guide 10". A gas introduction pipe may also be provided near the center of the film conveyance guide 10" on the reverse side thereof from the film conveyance face.

The film conveyance guide 10" illustrated in FIG. 7 is substantially cylindrical, but the film conveyance guide may also have a substantially half-cylindrical shape in which the film conveyance face is formed in a curved surface. The shape of the film conveyance guide is not particularly limited, but a shape in which the film conveyance face is convex and curved is preferred for use.

A single slit nozzle 108 is provided in the film conveyance guide 10" illustrated in FIG. 7, but a plurality of slit nozzles may also be provided. The number of slit nozzles 108 is not particularly limited. When a plurality of slit nozzles 108 are provided, the slit nozzles are preferably arranged so as to be aligned at a predetermined interval in the circumferential direction of the film conveyance guide 10".

The curvature radii of the convex curved film conveyance faces of the film conveyance guides 10a through 10e may all be the same or different. However, because the film conveyance faces become susceptible to buckling in the width direction due to conveyance tension, and wrinkling or roughness is prone to occur when the curvature radius of the film conveyance faces is increased, the curvature radius of the film conveyance faces is preferably 15 mm to 250 mm, and more preferably 15 mm to 75 mm.

Correspondingly, the curvature radius of curved parts in the conveyance path of the polyimide film 50 is preferably greater than 15 mm and no more than 270 mm, and more preferably greater than 15 mm and no more than 95 mm.

As illustrated in FIG. 1, film conveyance guides 10 having convex curved film conveyance faces are arranged along a conveyance line so that the convex curved film conveyance faces thereof alternatively face in opposite directions, and the polyimide film 50 can thereby be bent in alternatingly opposite directions and tensioned in a zigzag shape.

Figure 8:
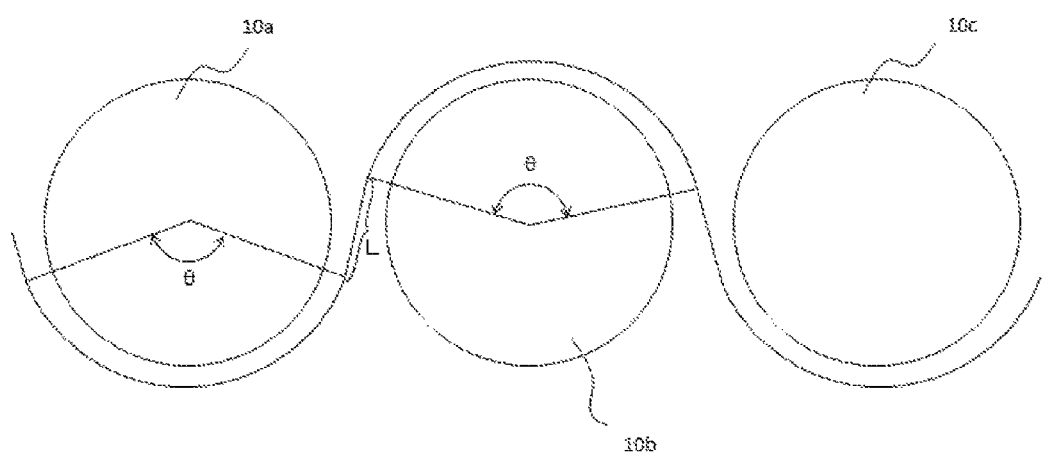
FIG. 8 is an explanatory drawing illustrating an example of the curved shape of the polyimide film in relation to the film conveyance guides.

FIG. 8 is a view illustrating an example of the curving shape of the polyimide film 50 in relation to the film conveyance guide 10. Here, the angle θ (referred to hereinafter as the "carrying angle θ") at which the polyimide film 50 is bent along the film conveyance faces of the film conveyance guides 10 is preferably 60 to 270°, more preferably 90 to 270°, and most preferably 150 to 240°. When the carrying angle θ is less than 60°, the rigidity-imparting effect of the bending shape on the polyimide film 50 is lacking, and when the carrying angle θ exceeds 270°, the interval at which the film conveyance guides 10 are arranged is too narrow, and sufficient installation space may not be obtained.

The length L of a linear part from one curved part to the next curved part when the polyimide film 50 crosses an adjacent film conveyance guide 10 is preferably set so as to be 50 mm or less, and is more preferably set so as to be 30 mm or less. When the length L of the linear part exceeds 50 mm, the rigidity of the polyimide film 50 decreases in the linear part, and the tendency toward wrinkling is increased.

The stress relaxation device 1 illustrated in FIG. 1 is divided into regions 12a through 12e in which the film conveyance guides 10a through 10e are arranged, by partition plates 11 in which slits for film conveyance are provided. The division width of each region is not particularly limited, but is preferably sufficient to allow one to three film conveyance guides to be present in each division.

In the present embodiment, in a region 12b, infrared heaters IR1, IR2 are arranged on the reverse side of the polyimide film 50 from the side thereof where the film conveyance guide 10b is arranged. Providing the infrared heaters makes it possible to increase the efficiency of heating and to further reduce the size of the stress relaxation device. The temperature of heating by the infrared heaters is not particularly limited, but is preferably higher than the temperature of the hot wind jetted from the film conveyance guide 10b, and more preferably ranges from the temperature of the hot wind jetted from the film conveyance guide 10b to 300° C. above the temperature of the hot wind jetted from the film conveyance guide 10b.

Two infrared heaters are arranged in the region 12b in FIG. 1, but the number of infrared heaters is not particularly limited. The region in which the infrared heaters are arranged is also not limited to the region 12b, and infrared heaters may be arranged in another region, but the infrared heaters are preferably arranged in the region whereby the polyimide film 50 attains the highest temperature (region of highest attained temperature). Also, installation of infrared heaters is not necessarily required, and the infrared heaters may be omitted.

The polyimide film 50 introduced into the stress relaxation device 1 is conveyed in a non-contact state by the gas jetted from the gas injection holes provided in the film conveyance guides 10a through 10e. A heated gas is jetted from the gas injection holes of the film conveyance guides 10a through 10e, and the polyimide film 50 is therefore heated by the heated gas and subjected to stress relaxation treatment.

The inside of the stress relaxation device 1 is also divided into a plurality of regions 12a through 12e by the partition plates 11. Heated gas having a temperature individually set in advance is therefore jetted from the gas injection holes of each film conveyance guide, and the polyimide film 50 can be treated in a state in which the temperature thereof is increased and decreased in stages. For example, in the first half of the regions of the stress relaxation device 1, the polyimide film can be heated at an arbitrary rate of temperature increase and treated at an arbitrary highest attained temperature, and in the latter half of the regions, the polyimide film can be cooled at an arbitrary rate of temperature decrease and treated.

To cite a specific example of the method for stress relaxation treatment, the regions 12a to 12b are designated as a first region in which the polyimide film is heated to a temperature equal to or higher than a temperature which is set in a range of (polyimide film Tg−150)° C. to (polyimide film Tg+200)° C., the regions 12c to 12d are designated as a second region having a lower temperature than the temperature set in the first region, and in which the polyimide film is brought to a temperature which is set in a range of (polyimide film Tg−150)° C. to (polyimide film Tg)° C., and the region 12e is designated as a third region having a lower temperature than the temperature set in the second region, and in which the polyimide film is cooled to a temperature which is set in the range of (polyimide film Tg−150)° C. to normal temperature (ambient temperature or room temperature). The polyimide film is preferably cooled to normal temperature in the third region.

In the first region, the polyimide film is heated to a temperature equal to or above the abovementioned set temperature, and stress remaining in the heat-cured polyimide film can thereby be efficiently relaxed. The Tg (glass transition temperature) of the polyimide film is the boundary temperature at which the mobility of the polymer constituting the polyimide film significantly changes. In the present invention, the value used as the Tg of the polyimide film is the peak temperature of tan δ measured at a frequency of 1 Hz and a temperature increase rate of 10° C./minute using a dynamic viscoelasticity measuring device (RSA-G2 manufactured by TA Instruments).

In the first region, the temperature of the gas jetted from the gas injection holes of the film conveyance guides 10a to 10b is preferably adjusted so that the temperature of the polyimide film 50 can be increased in stages. In the second and third regions, the temperature of the gas jetted from the gas injection holes of the film conveyance guides 10c to 10d is preferably adjusted so that the temperature of the polyimide film 50 can be decreased in stages. By changing the temperature in stages in the first region, which is a reheating step, and in the second region, which is a step for cooling and solidifying, the polyimide film 50 can be smoothly heat treated, and it is possible to prevent wrinkling or roughness which accompanies sudden temperature changes.

The levitation conveyance device is used in all of the first region (regions 12a to 12b), the second region (regions 12c to 12d), and the third region (region 12e) in the stress relaxation device illustrated in FIG. 1. However, the polyimide film is not prone to scratches and the like in the third region (region 12e), and a configuration may therefore be adopted in which treatment is performed using the levitation conveyance device only in the first region (regions 12a to 12b) and the second region (regions 12c to 12d), and using a conveyance device other than the levitation conveyance device in the third region (region 12e). A contact-type guide roller or the like is cited as an example of a conveyance device other than the levitation conveyance device.

The stress relaxation treatment is preferably performed by conveying the polyimide film 50 in a non-contact state over the film conveyance guides, and without fixing the edges at both ends of the polyimide film by a holding fixture or the like. When the edges at both ends of the polyimide film 50 are fixed by a holding fixture, the residual stress sometimes cannot be adequately reduced, and dimensional stability is reduced.

The polyimide film obtained by performing the stress relaxation treatment in this manner has excellent flatness and has minimal scratches, wrinkling, roughness, and the like on the surface thereof. In particular, through use of the film conveyance guides illustrated in FIGS. 3 through 5, the heated gas can be blown and the stress relaxation treatment performed substantially uniformly over the entire surface of the polyimide film. Uneven pressure, uneven heating, or the like therefore does not readily occur, and residual stress can be efficiently relaxed. Wrinkling, roughness, and the like on the film surface can also be suppressed, and a polyimide film having good flatness can be efficiently manufactured.

A polyimide film manufactured in this manner is preferred for use in insulating materials, substrates for electric/electronic components, and the like. For example, the polyimide film can be used as a tape substrate for a TAB tape, a COF tape, or the like, a cover substrate for a chip member or the like such as an IC chip, or as a base substrate for a liquid crystal display, an organic electroluminescence display, electronic paper, a solar cell, a printed circuit substrate, or the like.

Second Embodiment

The stress relaxation device used in a second embodiment of the present invention will next be described using FIG. 2. Portions that are essentially the same as in the stress relaxation device illustrated in FIG. 1 are referred to by the same reference numerals, and no description thereof is given.

Figure 2:
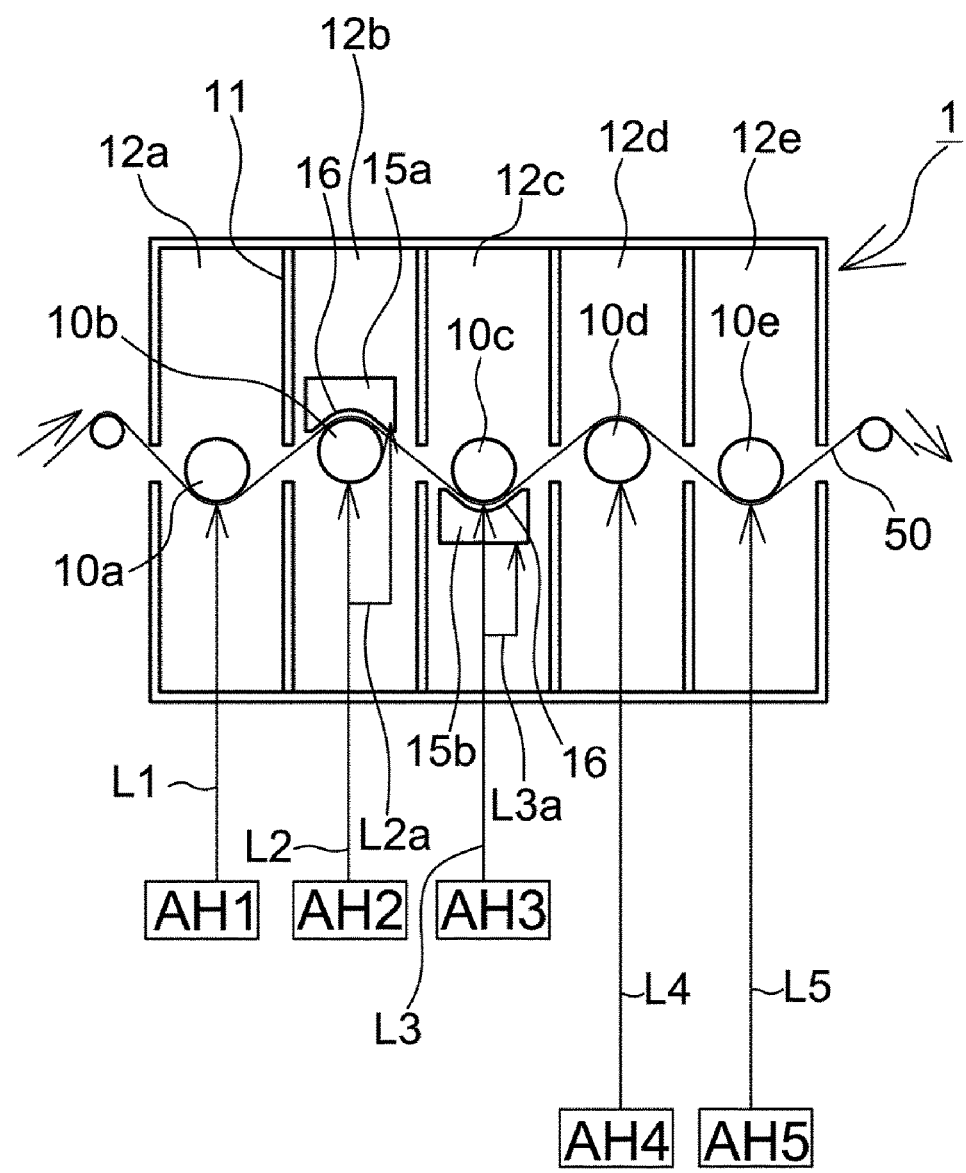
FIG. 2 is a schematic diagram of the stress relaxation device used in the polyimide film manufacturing apparatus according to a second embodiment of the present invention.

In regions 12b, 12c of the stress relaxation device illustrated in FIG. 2, film presser devices 15a, 15b are arranged facing the film conveyance faces of the film conveyance guides 10b, 10c.

The film presser devices are configured so as to jet gas toward the film conveyance faces of the film conveyance guides arranged facing the film presser devices and press the polyimide film passing between the conveyance faces of the conveyance guides and the film presser devices against the film conveyance faces of the film conveyance guides by the jetting pressure of the gas.

In the stress relaxation device illustrated in FIG. 2, the film presser devices 15a, 15b have a concave curved faces 16 arranged across a predetermined gap from the film conveyance faces of the film conveyance guides 10b, 10c. Gas injection holes (not illustrated) are provided on the concave curved faces 16. Gas introduction pipes L2a, L3a extending from hot-wind heaters AH2, 3 are connected to the film presser devices 15a, 15b, and the film presser devices 15a, 15b are configured so that heated gas can be jetted therefrom.

In the stress relaxation device illustrated in FIG. 2, when the gas is introduced to the film conveyance guides and the film presser devices through the gas introduction pipes, the gas is jetted from the gas injection holes of the film conveyance guides and the film presser devices. The polyimide film 50 is thereby conveyed in levitated fashion by the jetting pressure of the gas jetted from the film conveyance guides 10a, 10d, 10e in the regions 12a, 12d, 12e. In the regions 12b, 12c, the polyimide film 50 is conveyed in levitated fashion in interposition between the gas jetted from the film conveyance faces of the film conveyance guides 10b, 10c and the gas jetted from the film presser devices 15a, 15b.

Here, when the gas is blown against only one side of the polyimide film and the polyimide film is conveyed in levitated fashion, the pressure exerted on the polyimide film is sometimes greater near the center in the width direction than at both sides in the width direction of the polyimide film. Uneven pressure in the width direction of the polyimide film is not particularly problematic when the temperature of the polyimide film is low, but when the polyimide film is exposed to high temperature, uneven heating sometimes occurs and flatness decreases. On the other hand, by blowing gas against both sides of the polyimide film and conveying the polyimide film is levitated fashion, the polyimide film can be conveyed in levitated fashion substantially without uneven pressure thereon. Uneven heating of the polyimide film therefore occurs less readily, and a polyimide film having better flatness can be obtained.

In the present embodiment, heated gas is jetted from the film presser devices 15a, 15b, and the heated gas is therefore blown against both sides of the polyimide film 50 in the regions 12b, 12c. The polyimide film can therefore be rapidly heated to the desired temperature, and the stress relaxation treatment can be more efficiently performed. The device can also be more compact in total length.

In the present invention, the structure of the film presser devices is not particularly limited, and gas injection holes may be formed in the faces (referred to hereinafter as film presser faces) thereof which face the film conveyance faces of the film conveyance guides. For example, the film presser devices may have a structure in which a porous material such as a layered mesh, a porous ceramic, a porous metal, or a punched metal material the same as in the film conveyance guides is arranged on the film presser face, and gas is jetted through the porous material, a structure in which gas jetting holes are punched in the film presser face, or a structure in which a slit nozzle is formed in the film presser face. A structure in which gas is jetted through a porous material is preferred. The gas can thereby be substantially uniformly blown against the polyimide film passing between the conveyance faces of the film conveyance guides and the film presser devices. The porous material used may be same as the porous material described as being used in the film conveyance guides of the first embodiment.

In the present invention, the shape of the film presser devices is not particularly limited. An appropriate shape is preferably selected so as to correspond to the shape of the film conveyance devices facing the film presser devices. In a preferred shape combination, the film conveyance faces of the film conveyance guides are convex and curved, and the film presser faces of the film presser devices are concave and curved. In this case, the film presser faces of the film presser devices are more preferably concave and curved, and face the film conveyance faces of the film conveyance guides while having a larger curvature radius than the film conveyance faces of the film conveyance guides, and are arranged at a certain pre-set distance from the film conveyance faces of the film conveyance guides. Through such a shape combination, the gas is blown at a uniform pressure against the polyimide film from the film conveyance faces of the film conveyance guides and the film presser faces of the film presser devices. The polyimide film can therefore be conveyed so as to form a curved face having a stable shape, and the resultant polyimide film can be endowed with better flatness.

In the present invention, the gap between the film conveyance faces of the film conveyance guides and the film presser faces of the film presser devices is preferably 0.2 to 40 mm, more preferably 0.2 to 10 mm, and most preferably 0.2 to 5 mm. When this gap is less than 0.2 mm, the polyimide film is prone to touch the film conveyance guides and the film presser devices.

In the present invention, the temperature of the gas jetted from the film presser devices may be the same as or different from the temperature of the heated gas jetted from the film conveyance guides arranged facing the film presser devices.

In the present invention, the flow speed of the gas jetted from the film presser devices may be the same as or different from the flow speed of the heated gas jetted from the film conveyance guides arranged facing the film presser devices. The flow speed of the gas jetted from the film presser devices is preferably 0.5 to 1.5 times the flow speed of the heated gas jetted from the film conveyance guides arranged facing the film presser devices. Setting the gas flow speed in this range makes it possible to effectively suppress uneven pressure on the polyimide film.

In the present invention, the width-direction length of the regions of the film presser faces of the film presser devices in which the gas jetting holes are formed is preferable to be substantially equal to the width-direction length of the regions of the film conveyance faces of the oppositely arranged film conveyance guides in which the gas jetting holes are formed. When the regions in which the gas jetting holes are formed in the film presser devices are configured in the abovementioned range, the polyimide film can be conveyed in levitated fashion substantially without uneven pressure thereon.

The film presser devices are arranged in the regions 12b, 12c in the present embodiment, but may also be arranged in only one of the regions 12b, 12c. Film presser devices may also be arranged in all of the regions 12a through 12e. The film presser devices are preferably arranged in the regions of the abovementioned first region (regions 12a to 12b) and second region (regions 12c to 12d) in which the polyimide film is exposed to particularly high temperatures.

In the present embodiment, the film conveyance device and the film presser device in each region are configured so that heated gas is introduced thereto from the same heater, respectively, but a configuration may be adopted in which heated gas having the same or a different temperature is introduced from different heaters.

The infrared heaters in the first embodiment may be provided in the second embodiment as well, taking into account the arrangement of the film presser devices.

The embodiments described above are examples of applications of the present invention to a polyimide film, but the present invention is not limited to polyimide films and can be applied in stress relaxation treatments for various types of films.

Thermoplastic resins are primarily cited as examples of film substrates suitable for performing the stress relaxation treatment in the present invention, and polycarbonates, polyesters, polyether sulfones, polyacrylates, polyimides, polyolefins, and the like are suitable for use as common resins for optical films. A polyethylene terephthalate, polymethyl methacrylate, polysulfone, polyethylene, polyvinyl chloride, alicyclic olefin polymer, acrylic-based polymer, cellulose diacetate, cellulose triacetate, cellulose acetate propionate, or the like may also be used.

EXAMPLES

Test Example 1

Examples 1-4

A polyimide film (thickness: 25 μm, Tg: 340° C.) manufactured using 3,3',4,4'-biphenyltetracarboxylic dianhydride as the tetracarboxylic dianhydride component and p-phenylenediamine as the diamine component was introduced into the stress relaxation device illustrated in FIG. 1, and stress relaxation treatment was performed under the heating conditions illustrated in Table 1. A polyimide film was successfully conveyed in a non-contact state in Examples 1 through 4.

The carrying angle θ illustrated in FIG. 8 was 150° in each of the film conveyance guides, and the length L of the linear part between the film conveyance guides was 50 mm.

The flatness, dimensional stability, and presence of scratches were evaluated in the polyimide films after the stress relaxation treatment. Flatness was evaluated by spreading a sample cut to A4 size on a flat table surface and visually evaluating wrinkling or roughness in the film by comparison with a polyimide film not subjected to the stress relaxation treatment.

Flatness is indicated as "⊚" when the surface state of the sample was equivalent to that the polyimide film not subjected to the stress relaxation treatment, as "○" when the surface state of the sample was substantially equivalent to that of the polyimide film not subjected to the stress relaxation treatment, and as "X" when the surface state of the sample was markedly different from that of the polyimide film not subjected to the stress relaxation treatment. To evaluate the dimensional stability of the polyimide film, the coefficient of linear thermal expansion (CTE) thereof was measured using a thermomechanical analyzer (EX-STAR6100 TMA/SS, manufactured by SII Nanotechnology), and the presence of a point of significant change (inflection point) in the coefficient of linear thermal expansion (CTE) was verified. Cases in which there was no inflection point are indicated as "○," and cases in which an inflection point was present are indicated as "X." The presence of scratches was visually evaluated, "○" indicating the absence of noticeable scratches, and "X" indicating the presence of noticeable scratches. The results are shown in Table 1. In Table 1, the symbol "←" means that the entry is the same as the entry to the left thereof.

The film conveyance guides used in Examples 1 and 2 have a structure which is substantially cylindrical overall, in which a porous material 101 is arranged along substantially the entire periphery thereof except at both end parts 102a, 102b thereof, and a gas introduction pipe 103 is connected to one end part 102a thereof, as illustrated in FIG. 3.

The film conveyance guides used in Example 3 have a structure which is substantially cylindrical overall, in which gas jetting holes 105 are punched in a film conveyance face thereof and a gas introduction pipe 106 is connected to one end thereof, as illustrated in FIG. 6.

The film conveyance guides used in Example 4 have a structure which is substantially cylindrical overall, in which a slit nozzle 108 is formed on the top face thereof, and a gas introduction pipe 109 is connected to one end part thereof, as illustrated in FIG. 7. The size of the slit nozzle 108 (jetting hole) is T: 0.5 mm×W: 380 mm.

TABLE 1

|  | Example 1 | Example 2 | Example 3 | Example 4 |
|---|---|---|---|---|
| Conveyance tension (Mpa) | 0.2 | ← | ← | ← |
| Conveyance speed (m/min) | 1 | 2 | 1 | ← |
| Film conveyance guide used | FIG. 3 | ← | FIG. 6 | FIG. 7 |
| Film conveyance face | Porous material | ← | Punched metal | Slit |
| Size of jetting holes | Approx. | ← | 1 mm | 0.5 × |

TABLE 1-continued

|  |  | Example 1 | Example 2 | Example 3 | Example 4 |
|---|---|---|---|---|---|
|  |  | 100 μm |  |  | 380 mm |
| Hole interval of jetting holes |  | 0.4 mm | ← | 8 mm | — |
| Region 12a | Hot-air temperature (° C.) | 450 | ← | ← | ← |
|  | Diameter (mm) of film conveyance guides | 75 | ← | ← | ← |
| Region 12b | Hot-air temperature (° C.) | 450 | ← | ← | ← |
|  | Diameter (mm) of film conveyance guides | 75 | ← | ← | ← |
|  | Set temperature (° C.) of IR heater 1 | 650 | ← | ← | ← |
|  | Set temperature (° C.) of IR heater 2 | 650 | ← | ← | ← |
| Region 12c | Hot-air temperature (° C.) | 420 | ← | ← | ← |
|  | Diameter (mm) of film conveyance guides | 75 | ← | ← | ← |
| Region 12d | Hot-air temperature (° C.) | 180 | ← | ← | ← |
|  | Diameter (mm) of film conveyance guides | 75 | ← | ← | ← |
| Region 12e | Hot-air temperature (° C.) | Normal temperature | ← | ← | ← |
|  | Diameter (mm) of film conveyance guides | 75 | ← | ← | ← |
| Dimensional stability |  | ○ | ○ | ○ | ○ |
| Flatness |  | ○ | ○ | X | X |
| Presence of scratches |  | ○ | ○ | ○ | Δ |

As shown in Table 1, stress remaining in the heat-cured polyimide film was adequately relaxed and a polyimide film having good dimensional stability was obtained in each of Examples 1 through 4, in which a polyimide film was subjected to the stress relaxation treatment while being conveyed in a non-contact state using a levitation conveyance device for jetting heated gas from gas injection holes and conveying the polyimide film in a non-contact state.

In Examples 1 and 2, in which film conveyance guides having a structure in which heated gas was jetted through a porous material were used, the polyimide films had good flatness and were substantially devoid of wrinkling or roughness.

Test Example 2

Example 5

A polyimide film (thickness: 25 μm, Tg: 340° C.) manufactured using 3,3',4,4'-biphenyltetracarboxylic dianhydride as the tetracarboxylic dianhydride component and p-phenylenediamine as the diamine component was introduced into the stress relaxation device illustrated in FIG. 2, and stress relaxation treatment was performed under the conditions described below.

The film conveyance guides 10a through 10e used had the structure illustrated in FIG. 3, in which the film conveyance faces is formed by a porous material (size of injection holes: approximately 100 μm; hole interval of injection holes: 0.4 mm). The film conveyance guides 10a, 10b, 10d, 10e used had a substantially cylindrical shape having a diameter of 75 mm, and the film conveyance guide 10c used had a substantially cylindrical shape having a diameter of 150 mm.

The carrying angle θ illustrated in FIG. 8 was 150° in each of the film conveyance guides, and the length L of the linear part between the film conveyance guides was 50 mm.

In the film presser devices 15a, 15b used, the film presser faces were formed by a porous material (size of injection holes: approximately 100 μm; hole interval of injection holes: 0.4 mm) and were concave and curved along the film conveyance faces of the film conveyance guides 10b, 10c.

Stress relaxation treatment was performed under conditions of a conveyance tension of 0.2 MPa and a conveyance speed of 1 m/min. In the region 12a, a hot wind at a temperature of 250° C. was jetted at an airflow volume of 25 m³/min/m² from the film conveyance guide 10a. In the region 12b, a hot wind at a temperature of 450° C. was jetted at an airflow volume of 35 m³/min/m² from the film conveyance guide 10b, and a hot wind at a temperature of 450° C. was jetted at an airflow volume of 35 m³/min/m² from the film presser device 15a. In the region 12c, a hot wind at a temperature of 300° C. was jetted at an airflow volume of 20 m³/min/m² from the film conveyance guide 10c, and a hot wind at a temperature of 300° C. was jetted at an airflow volume of 20 m³/min/m² from the film presser device 15b. In the region 12d, a hot wind at a temperature of 200° C. was jetted at an airflow volume of 20 m³/min/m² from the film conveyance guide 10d. In the region 12e, normal-temperature gas was jetted at an airflow volume of 15 m³/min/m² from the film conveyance guide 10e.

In the stress relaxation treatment of the polyimide film performed under the conditions described above, the polyimide film was subjected to stress relaxation treatment while being conveyed in a non-contact state. In the region 12b, the gap between the film conveyance guide 10b and the polyimide film was 3 mm, and the gap between the film presser device 15a and the polyimide film was 3 mm. In the region 12c, the gap between the film conveyance guide 10c and the polyimide film was 3 mm, and the gap between the film presser device 15b and the polyimide film was 3 mm.

The dimensional stability of the polyimide film after stress relaxation was "○," the flatness was "◉," and the presence of scratches was "○."

Example 6

A polyimide film (thickness: 25 μm, Tg: 340° C.) manufactured using 3,3',4,4'-biphenyltetracarboxylic dianhydride as the tetracarboxylic dianhydride component and p-phenylenediamine as the diamine component was introduced into the stress relaxation device illustrated in FIG. 2 except that the film presser devices 15a, 15b of the stress relaxation device were not provided, and stress relaxation treatment was performed under the conditions described below. The film conveyance guides 10a through 10e used were the same as in Example 5. The conditions of the stress relaxation treatment were the same as in Example 5 except that a hot wind at a temperature of 450° C. was jetted at an airflow volume of 40 m³/min/m² from the film conveyance guide 10b in the region 12b, and a hot wind at a temperature of 300° C. was jetted at an airflow volume of 30 m³/min/m² from the film conveyance guide 10c in the region 12c.

In the stress relaxation treatment of the polyimide film performed under the conditions described above, the polyimide film was subjected to stress relaxation treatment while being conveyed in a non-contact state.

The dimensional stability of the polyimide film after stress relaxation was "○," the flatness was "○," and the presence of scratches was "○."

Based on the results of Examples 5 and 6, a polyimide film having better flatness can be obtained by performing the stress relaxation treatment while conveying the polyimide film in levitated fashion in interposition between the gas jetted from the film conveyance faces of the film conveyance guides and the gas jetted from the film presser devices.

EXPLANATION OF NUMERALS AND CHARACTERS

1: stress relaxation device
10a-10e, 10, 10': film conveyance guide
11: partition plate
12a-12e: region
15a, 15b: film presser device
16: concave curved face
50: polyimide film
101: porous material
103, 106: gas introduction pipe
105: gas jetting hole
110: mask material
IR1, IR2: infrared heater
L1-L5: gas introduction pipe
AH1-5: hot-wind heater

The invention claimed is:

1. A film manufacturing apparatus comprising a stress relaxation device for performing a stress relaxation treatment of a film, wherein:
the stress relaxation device comprises a levitation conveyance device for jetting a heated gas from gas injection holes to the film and heating and conveying the film in a non-contact state,
the levitation conveyance device comprises a plurality of film conveyance guides having convex curved film conveyance faces provided with gas injection holes, the convex curved film conveyance faces of the film conveyance guides being arranged so as to alternatingly face in opposite directions,
the levitation conveyance device further comprises film presser devices having concave curved faces arranged to face the convex curved film conveyance faces of the film conveyance guides across a predetermined gap from the convex curved film conveyance faces, gas injection holes being provided in the concave curved faces,
the levitation conveyance device is configured so as to jet the heated gas from the gas injection holes to the film and convey the film in a non-contact state in which the film is curved in alternatingly opposite directions, and
the heated gas is blown against both sides of the film and the film is conveyed in levitated fashion by the heated gas jetted from the gas injection holes of the film conveyance guides and the heated gas jetted from the gas injection holes of the film presser devices.

2. The film manufacturing apparatus according to claim 1, wherein the plurality of film conveyance guides are configured so that a temperature of the gas jetted from the gas injection holes of each of the film conveyance guides can be individually set.

3. The film manufacturing apparatus according to claim 1, wherein a length of a linear part leading from one curved part to a next curved part in a conveyance path of the film formed by the film conveyance guides is set to be at most 50 mm.

4. The film manufacturing apparatus according to claim 1, wherein the convex curved film conveyance faces of the film conveyance guides are formed from a porous material and configured to have a structure in which the heated gas is jetted through the porous material.

5. A film manufacturing apparatus comprising a stress relaxation device for performing a stress relaxation treatment of a film, wherein:
the stress relaxation device comprises a levitation conveyance device for jetting a heated gas from gas injection holes to the film and heating and conveying the film in a non-contact state,
the levitation conveyance device comprises a plurality of film conveyance guides having convex curved film conveyance faces provided with gas injection holes, the convex curved film conveyance faces of the film conveyance guides being arranged so as to alternatingly face in opposite directions,
the levitation conveyance device is configured so as to jet the heated gas from the gas injection holes to the film and convey the film in a non-contact state in which the film is curved in alternatingly opposite directions, and
the stress relaxation device subjects a polyimide film obtained by heat-treating a polyimide film precursor to the stress relaxation treatment.

6. The film manufacturing apparatus according to claim 5, wherein the plurality of film conveyance guides are configured so that a temperature of the gas jetted from the gas injection holes of each of the film conveyance guides can be individually set.

7. The film manufacturing apparatus according to claim 5, wherein a length of a linear part leading from one curved part to a next curved part in a conveyance path of the film formed by the film conveyance guides is set to be at most 50 mm.

8. The film manufacturing apparatus according to claim 5, wherein the convex curved film conveyance faces of the film conveyance guides are formed from a porous material and configured to have a structure in which the heated gas is jetted through the porous material.

9. A film manufacturing apparatus comprising a stress relaxation device for performing a stress relaxation treatment of a film, wherein:
the stress relaxation device comprises a levitation conveyance device for jetting a heated gas from gas injection holes to the film and heating and conveying the film in a non-contact state,
the levitation conveyance device comprises a plurality of film conveyance guides having convex curved film conveyance faces provided with gas injection holes, the convex curved film conveyance faces of the film conveyance guides being arranged so as to alternatingly face in opposite directions,
the levitation conveyance device is configured so as to jet the heated gas from the gas injection holes to the film and convey the film in a non-contact state in which the film is curved in alternatingly opposite directions, and
a curvature radius of the convex curved film conveyance faces of the film conveyance guides is configured to be 15 mm to 250 mm.

10. The film manufacturing apparatus according to claim 9, wherein the plurality of film conveyance guides are configured so that a temperature of the gas jetted from the gas injection holes of each of the film conveyance guides can be individually set.

11. The film manufacturing apparatus according to claim 9, wherein a length of a linear part leading from one curved part to a next curved part in a conveyance path of the film formed by the film conveyance guides is set to be at most 50 mm.

12. The film manufacturing apparatus according to claim 9, wherein the convex curved film conveyance faces of the film conveyance guides are formed from a porous material and configured to have a structure in which the heated gas is jetted through the porous material.

13. A film manufacturing apparatus comprising a stress relaxation device for performing a stress relaxation treatment of a film, wherein:
- the stress relaxation device comprises a levitation conveyance device for jetting a heated gas from gas injection holes to the film and heating and conveying the film in a non-contact state,
- the levitation conveyance device comprises a plurality of film conveyance guides having convex curved film conveyance faces provided with gas injection holes, the convex curved film conveyance faces of the film conveyance guides being arranged so as to alternatingly face in opposite directions,
- the levitation conveyance device is configured so as to jet the heated gas from the gas injection holes to the film and convey the film in a non-contact state in which the film is curved in alternatingly opposite directions, and an angle at which a film conveyance path formed by the film conveyance guides curves along the convex curved film conveyance face of one film conveyance guide is set to be 90° to 270°.

14. The film manufacturing apparatus according to claim 13, wherein the plurality of film conveyance guides are configured so that a temperature of the gas jetted from the gas injection holes of each of the film conveyance guides can be individually set.

15. The film manufacturing apparatus according to claim 13, wherein a length of a linear part leading from one curved part to a next curved part in a conveyance path of the film formed by the film conveyance guides is set to be at most 50 mm.

16. The film manufacturing apparatus according to claim 13, wherein the convex curved film conveyance faces of the film conveyance guides are formed from a porous material and configured to have a structure in which the heated gas is jetted through the porous material.

* * * * *